United States Patent
Shultz et al.

(10) Patent No.: US 7,831,977 B2
(45) Date of Patent: Nov. 9, 2010

(54) SHARED FILE SYSTEM CACHE IN A VIRTUAL MACHINE OR LPAR ENVIRONMENT

(75) Inventors: Steven Shultz, Endicott, NY (US); Xenia Tkatschow, Jamesville, NY (US)

(73) Assignee: International Business Machines Corporation, Armonk, NY (US)

(*) Notice: Subject to any disclaimer, the term of this patent is extended or adjusted under 35 U.S.C. 154(b) by 1555 days.

(21) Appl. No.: 11/147,549

(22) Filed: Jun. 7, 2005

(65) Prior Publication Data

US 2005/0223005 A1  Oct. 6, 2005

Related U.S. Application Data

(63) Continuation-in-part of application No. 10/425,468, filed on Apr. 29, 2003, now Pat. No. 7,328,437.

(51) Int. Cl.
G06F 9/46 (2006.01)
G06F 15/16 (2006.01)
G06F 12/00 (2006.01)

(52) U.S. Cl. .................. 718/104; 709/203; 711/153
(58) Field of Classification Search ............. 718/104; 709/203; 711/153
See application file for complete search history.

(56) References Cited

U.S. PATENT DOCUMENTS

| | | | | |
|---|---|---|---|---|
| 4,965,719 A | * | 10/1990 | Shoens et al. | 711/100 |
| 5,713,008 A | * | 1/1998 | Falkner | 711/118 |
| 6,075,938 A | | 6/2000 | Bugnion et al. | 395/500.48 |
| 6,170,045 B1 | | 1/2001 | Bobak et al. | 711/169 |
| 6,314,501 B1 | * | 11/2001 | Gulick et al. | 711/153 |
| 6,389,482 B1 | | 5/2002 | Bobak et al. | 709/312 |
| 6,496,909 B1 | * | 12/2002 | Schimmel | 711/163 |
| 6,542,926 B2 | | 4/2003 | Zalewski et al. | 709/213 |
| 6,738,977 B1 | | 5/2004 | Berry et al. | 719/332 |
| 2002/0099765 A1 | * | 7/2002 | Otis | 709/203 |
| 2003/0037178 A1 | | 2/2003 | Vessey et al. | 709/319 |

FOREIGN PATENT DOCUMENTS

| | | |
|---|---|---|
| JP | 63-036445 | 2/1988 |
| JP | 07-013823 | 1/1995 |
| JP | 2002-073358 | 3/2002 |
| WO | WO 00/73902 A1 | 7/2000 |

* cited by examiner

*Primary Examiner*—Meng-Ai An
*Assistant Examiner*—Camquy Truong
(74) *Attorney, Agent, or Firm*—Geraldine D. Monteleone (57) ABSTRACT

Computer system, method and program for defining first and second virtual machines and a memory shared by the first and second virtual machines. A filesystem cache resides in the shared memory. A lock structure resides in the shared memory to record which virtual machine, if any, currently has an exclusive lock for writing to the cache. The first virtual machine includes a first program function to acquire the exclusive lock when available by manipulation of the lock structure, and a second program function active after the first virtual machine acquires the exclusive lock, to write to the cache. The lock structure is directly accessible by the first program function. The cache is directly accessible by the second program function. The second virtual machine includes a third program function to acquire the exclusive lock when available by manipulation of the lock structure, and a fourth program function active after the second virtual machine acquires the exclusive lock, to write to the cache. The lock structure is directly accessible by the third program function. The cache is directly accessible by the fourth program function. Another computer system, method and program is embodied in logical partitions of a real computer, instead of virtual machines.

14 Claims, 6 Drawing Sheets

SHARED FILE SYSTEM CACHE IN A VIRTUAL MACHINE OR LPAR ENVIRONMENT

This is a Continuation-in-Part of U.S. patent application entitled "Management of Locks in a Virtual Machine Environment", Ser. No. 10/425,468 filed Apr. 29, 2003 by Donovan et al., now U.S. Pat. No. 7,328,437.

BACKGROUND

The present invention relates generally to computer systems, and deals more particularly with a cache for virtual machines and logical partitions.

A virtual machine is a virtual sharing/partitioning of real resources such as real memory, CPU and I/O. A known virtual machine operating system includes a common base portion and separate user portions formed by the common base portion. In an IBM z/VM operating system, the common base portion is called the "Control Program" or "CP" and each user portion is called a "virtual machine" or "guest". A guest operating system executes/runs on each virtual machine, and one or more applications run on the guest operating system. Each application and guest operating system operate as if they are running on their own private, real computer.

In some computing environments, resources are shared amongst multiple programs. Shared resources consist of shared data (including shared files and shared directories) and shared processing routines. For example, in IBM VM/370 shared data was stored in shared memory accessible by multiple virtual machines. Also, in IBM VM/CMS, some portions of memory private to the virtual machine are shared among multiple programs in the same virtual machine. VM/CMS uses private locks to determine when access to the shared memory can be parallel and when such access must be sequential. Also in VM/CMS, there are processing routines private to the virtual machine which all programs in the same virtual machine use to access external storage mediums. VM/CMS uses private locks to determine when shared processing routines can be executed in parallel and when such routines must be executed sequentially. While VM/CMS is effective in sharing resources, it is limited to sharing resources within a single virtual machine.

In IBM VM/SP6 operating system and subsequent releases of IBM VM/ESA and IBM z/VM operating systems, data to be shared amongst multiple virtual machines (with a common base portion) resides in private memory of one server virtual machine. Likewise, a lock management structure resides in the server virtual machine. This data is shared by multiple virtual machines by requiring all virtual machines to communicate with the server virtual machine to request access to the shared data. Such communication is in the form of TCP/IP, IUCV or Guest LAN messages (described below), which require significant overhead. The server virtual machine then uses its private locks to arbitrate access to the shared data. A similar arrangement is used to arbitrate the use of shared processing routines. While the foregoing arrangement provides access by multiple virtual machines to shared resources, it requires a significant overhead communication protocol between the requesting virtual machines and the server virtual machine.

In general, a cache is a high speed, limited capacity semiconductor memory such as RAM, which contains portions or pages of data stored on relatively slow access, magnetic disk. There are many known algorithms for determining which pages to retain in cache; however, typically, the least recently used pages are outpaged to storage to make room for new pages requested to be updated/written or read by a program. Because a program will typically perform multiple operations on a single page while resident in cache, the cache improves overall reading and writing speed. Thus, the combination of a cache and disk storage provide high speed access and large capacity storage.

Nonshared filesystem caches are known for both shared and nonshared files.

It was known for two different applications in the same real computer or the same virtual machine to share a read/write cache in memory for files stored in high capacity storage.

In a virtual machine environment, it was known to provide nonshared (i.e. private to/accessible by respective virtual machines or specific programs in each virtual machine) read/write caches in nonshared RAM for nonshared files in external (disk) storage. It was also known from U.S. Pat. No. 6,075,938 to provide a shared (i.e. shared by/accessible by multiple virtual machines and their programs) read-only cache in RAM for shared files in external (disk) storage.

It was known for a file system to store both file system data and file system metadata. The metadata comprises information about the file system data, such as a directory/hierarchy of files in the file system to locate a file of interest, size of file, etc. It was known to provide a nonshared cache for both file system data and file system metadata.

Logical partitions ("LPARs") are also known today within a real computer. An LPAR is a logical partitioning of the real resources, i.e. CPU, RAM, etc. The CPU is logical partitioned by allocated time slices to respective LPARs. The RAM is logically partitioned by dividing the memory between the different partitions.

It was known for two different applications in the same LPAR to share a read/write cache in memory for files stored in high capacity storage.

A general object of the present invention is to provide a shared, read/write filesystem cache for high capacity storage in a virtual machine environment.

Another general object of the present invention is to provide a shared, read/write filesystem cache for high capacity storage in an LPAR environment.

Another object of the present invention is to provide such read/write filesystem caches in an effective and efficient manner.

SUMMARY OF THE INVENTION

The invention resides in a computer system, method and program for defining first and second virtual machines and a memory shared by the first and second virtual machines. A filesystem cache resides in the shared memory. A lock structure resides in the shared memory to record which virtual machine, if any, currently has an exclusive lock for writing to the cache. The first virtual machine includes a first program function to acquire the exclusive lock when available by manipulation of the lock structure, and a second program function active after the first virtual machine acquires the exclusive lock, to write to the cache. The lock structure is directly accessible by the first program function. The cache is directly accessible by the second program function. The second virtual machine includes a third program function to acquire the exclusive lock when available by manipulation of the lock structure, and a fourth program function active after the second virtual machine acquires the exclusive lock, to write to the cache. The lock structure is directly accessible by the third program function. The cache is directly accessible by the fourth program function.

The invention resides in a computer system, method and program for defining first and second logical partitions and a memory shared by the first and second logical partitions. A filesystem cache resides in the shared memory. A lock structure resides in the shared memory to record which logical partition, if any, currently has an exclusive lock for writing to the cache. The first logical partition includes a first program function to acquire the exclusive lock when available by manipulation of the lock structure, and a second program function active after the first logical partition acquires the exclusive lock, to write to the cache. The lock structure is directly accessible by the first program function. The cache is directly accessible by the second program function. The second logical partition includes a third program function to acquire the exclusive lock when available by manipulation of the lock structure, and a fourth program function active after the second logical partition acquires the exclusive lock, to write to the cache. The lock structure is directly accessible by the third program function. The cache is directly accessible by the fourth program function.

DETAILED DESCRIPTION OF THE PREFERRED EMBODIMENTS

Figure 1:
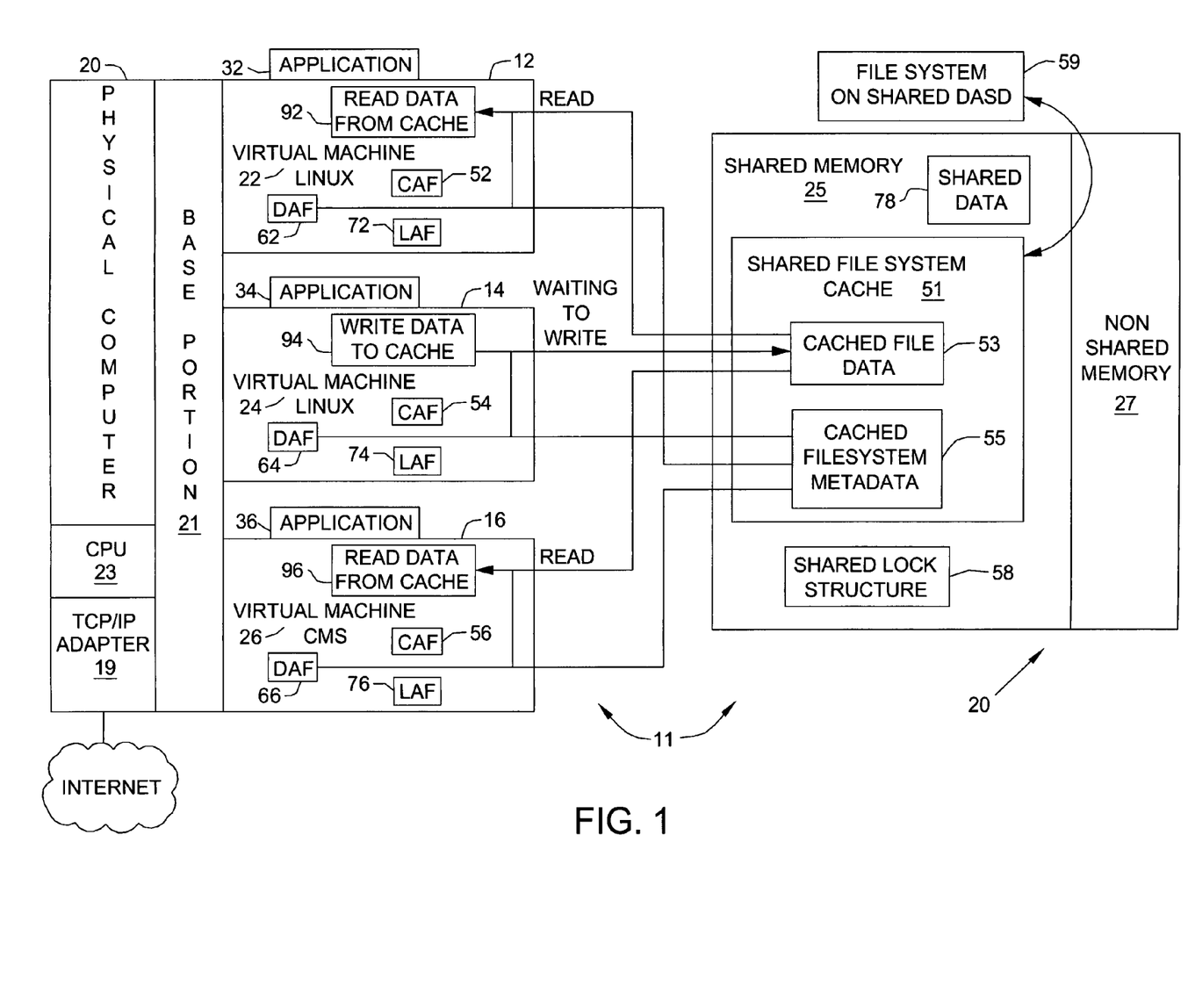
FIG. 1 is a block diagram of a computer system including a virtual machine operating system with a shared read/write filesystem cache, data access functions ("DAFs"), lock access functions ("LAFs") and cache access functions ("CAFs") for respective virtual machines, according to a first embodiment of the present invention.

The present invention will now be described in detail with reference to the drawings, where like reference numbers indicate like elements. FIG. 1 illustrates a computer system generally designated 10 according to an embodiment of the present invention. Computer system 10 includes a physical computer 20 (which includes a CPU 23, semiconductor memory/RAM 30 and disk storage 59) and a virtual machine operating system 11. By way of example, the virtual machine operating system can be IBM z/VM version 4.2.0 or 4.3.0 modified to include the present invention. The details of z/VM 4.2.0 are disclosed in IBM publication "z/VM 4.2.0 General Information" (Document Number: GC24-5991-03) which is available from International Business Machines Corp. at PO Box 29570, IBM Publications, Raleigh, N.C. 27626-0570 or on the WWW at www.IBM.com/shop/publications/order. This publication is hereby incorporated by reference as part of the present disclosure. Operating system 11 executes in the physical computer 10 such as an IBM zSeries server although the present invention can be implemented in other server computers or personal computers as well. Operating system 11 includes a common base portion 21 (called "CP" in the z/VM operating system). Common base portion 21 logically partitions the resources (including the CPU and memory) of the physical computer to form user portions or virtual machines 12, 14 and 16. In these logical partitions, the each virtual machine has a "virtual CPU", i.e. a time-slice portion of the real CPU(s) that appears to the guest operating system as its own CPU. The common base portion also performs functions such as virtualizing memory, virtualizing devices and virtualizing CPUs. Guest operating systems 22, 24 and 26 execute on virtual machines 12, 14 and 16, respectively, and applications 32, 34 and 36 execute on guest operating systems 22, 24 and 26 respectively. There may be multiple applications executing on each operating system. By way of example, guest operating systems 22 and 24 are the Linux (TM of Linus Torvalds) operating system, and guest operating system 26 is an IBM CMS operating system. Other guest operating systems executing on virtual machines are also feasible such as Microsoft Windows (tm) operating system, Unix (tm) operating system, Sun Microsystems Solaris (tm) operating system or Hewlett Packard HP UX operating system. By way of example, applications 32, 34 and 36 can be IBM DB2 data base management application, IBM WebSphere application, communications applications, etc. The nature of applications 32, 34 and 36 form no part of the present invention, except that they may request to access shared files in storage 59 via shared filesystem cache 51. As explained in more detail below, shared read/write filesystem cache 51 stores a limited number of portions or "pages" of shared filesystem data and metatdata (data describing the topology of the filesystem) stored in storage 59 so the programs within virtual machines 12, 14 and 16 can rapidly access these file portions or pages for reading and writing.

Each virtual machine has its own private memory in nonshared memory area 27 (typically semiconductor RAM) for its private data, applications and operating system program functions such as Cache Access Functions ("CAFs") 52, 54, and 56, Data Access Functions ("DAFs") 62, 64 and 66 and Lock Access Functions ("LAFs") 72, 74 and 76 in virtual machines 12, 14 and 16, respectively. Consequently, each virtual machine is afforded a measure of privacy from the other virtual machines as in separate physical computers.

Computer 10 also includes a shared memory area 25 (typically semiconductor RAM) which is shared by all of the virtual machines 12, 14 and 16. (RAM provides very fast access, much faster than access to disk storage.) Being "shared" each virtual machine 12, 14 and 16 can directly access the shared memory 25 and its shared data and shared data structures by appropriate address. The shared data structures include shared filesystem cache 51 and shared lock structure (or control block) 58. By way of example, the disk storage 59 may comprise hundreds or thousands of megabytes, gigabytes or terabytes or more (the available disk capacity tends to grow every year), and the shared filesystem cache 51 may have a small fraction of this capacity, for example, tens of megabytes or even a hundred megabyte (cache capacity may grow with new computers every year) The shared filesystem cache 51 includes shared cached file data 53 and shared cached file system metadata 55. The shared cached file data 53 comprises cached portions or "pages" of file data stored on external disk (or other, high capacity) storage 59. The shared cached file system metadata 55 comprises cached portions or pages of metadata stored on external disk storage 59. The metadata comprises information about the file data, such as a directory/hierarchy of files in a file system to locate a file of interest, size of file, etc. Each file system generates the metadata for the files in its system. The operating system in each virtual machine may include a file system program function, the file system program can be a separate application executing in each virtual machine or there can be one file system program for the entire real computer or common base portion. The single file system program (for the entire real computer) is typically used for files to be shared amongst different virtual machines. All the virtual machines 12, 14 and 16 (and their programs 22, 32, 24, 34, 26 and 36) can read from and write to the shared filesystem cache 51 to read from and write to the shared cached file data 53 and shared cache file system metadata 55. Within each virtual machine 12, 14 and 15, a respective DAF 62, 64 and 66 manages the read and write requests (made by programs 22, 32, 24, 34, 26 and 36) to the shared filesystem cache 51, a respective LAF 72, 74 and 76 obtains the requisite lock for the shared filesystem cache 51 (to permit synchronized reading and writing in a shared environment) and a respective CAF 52, 54 and 56 outpage from and inpage to the shared cache 51 as needed. (There can also be other shared data 78, included shared files and a shared directory, within shared memory 25.) A shared lock data structure 58 which records holder of and waiters for the locks, also resides in shared memory 25. LAFs 72, 74 and 76 access and manage the shared lock data structure 58 to obtain or release a lock for the shared data in shared cache 51. Each of the LAFs abides by the records of the shared lock structure. CAFs 52, 54 and 56, DAFs 62, 62 and 66 and LAFs 72, 74 and 76 access the shared filesystem cache 51, shared data 78 and shared lock 58 pursuant to read and write requests made by their respective applications 32, 34 and 36 and their respective operating systems 22, 24 and 26.

In the state illustrated in FIG. 1 (which is an example of a situation in the present invention), virtual machines 12 and 16 are concurrently reading cache file data 53 and associated cached filesystem metadata 55 from shared filesystem cache 51, and virtual machine 14 is waiting to write new cache file data and new cached filesystem metadata to shared filesystem cache 51. As explained below, virtual machine 14 cannot write to shared filesystem cache 51 until virtual machines 12 or 16 conclude their access to the shared filesystem cache 51 and relinquish their lock, because a write operation would alter the cache file data and metadata being read by virtual machines 12 and 16. In the case of virtual machine 12, the read request 92 originated from application 32 which passed it to operating system 22 for execution. Likewise, in the case of virtual machine 16, the read request 94 originated from application 36 which passed it to operating system 26 for execution. In the case of virtual machine 14, the write request originated from operating system 24. However, the source of the read and write request within each virtual machine is not important to the present invention; the foregoing is just an example.

Figure 2:
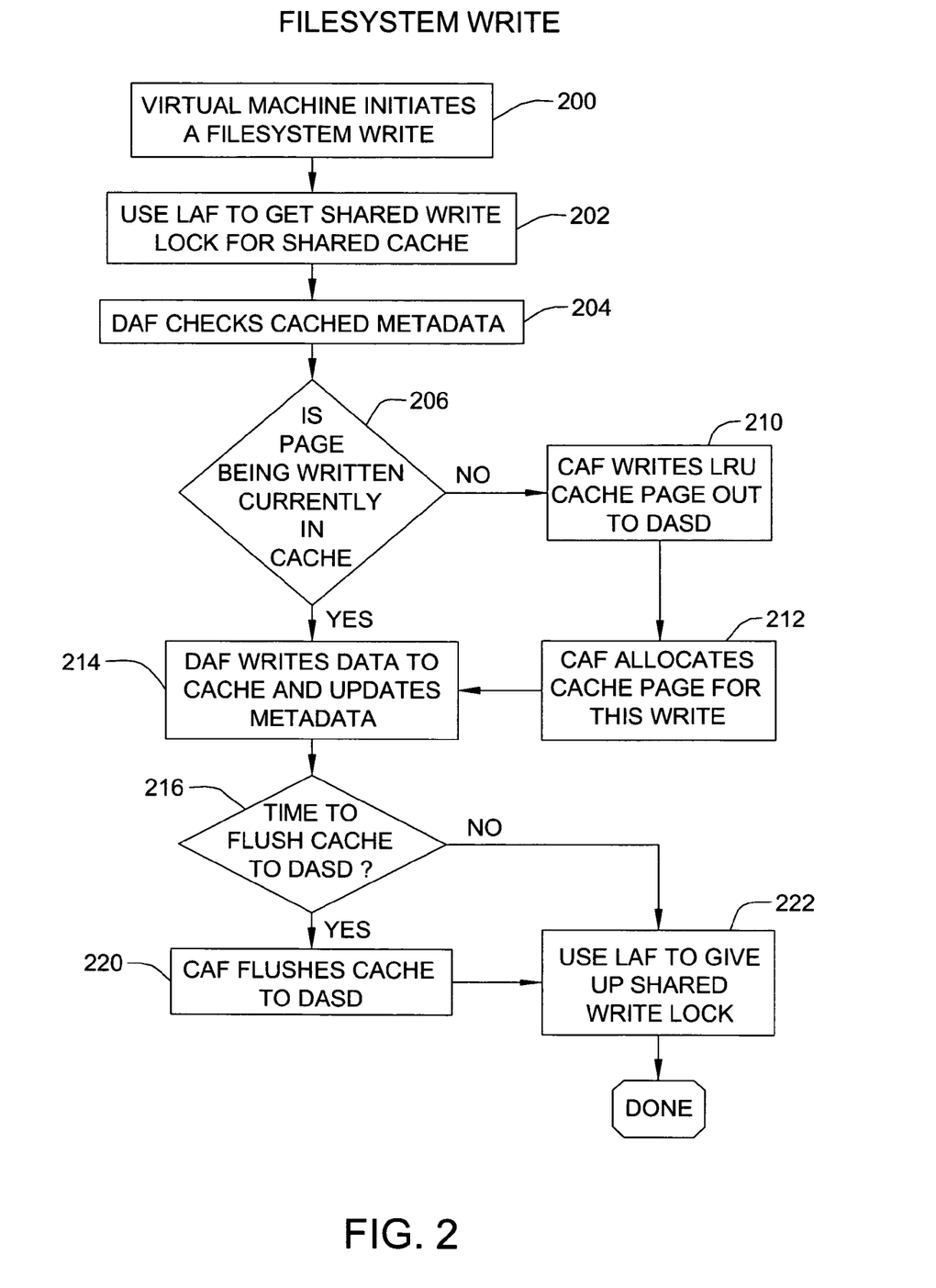
FIG. 2 is a flow chart illustrating a write operation utilizing the shared cache, DAFs, LAFS and CAFs of FIG. 1.

FIG. 2 illustrates operation of each LAF, CAF and DAF when the respective virtual machine initiates writing to shared filesystem cache 51. The following iteration of the steps of FIG. 2 is one possible scenario of the LAFs, CAFs and DAFs, for purposes of explanation. In step 200, application 34 within the virtual machine 14 invokes DAF 64 (within operating system 24) to request a write to the shared filesystem cache 51. In response, DAF 64 invokes LAF 74 (within operating system 24) to obtain an exclusive/write lock for the shared cache 51. In response, LAF 74 checks shared lock structure 58 for the exclusive/write lock for the shared cache 51 (step 202). The process by which LAF 73 obtains the exclusive/write lock is described in more detail below with reference to FIGS. 4 and 5. The exclusive/write lock will not be available if there is a current holder of any type of lock on shared filesystem cache 51 and/or if there are pending requests for a lock on a lock wait queue ahead of the request of DAF 54. When LAF 74 obtains the exclusive/write lock for the shared filesystem cache 51, LAF 74 notifies DAF 64. Then, DAF 64 reads the cached filesystem metadata 55 to determine if the file portion or "page" to which application 34 wants to update/write currently resides in shared filesystem cache 51 as a page of cached file data 53 (step 204). If not (decision 206, no branch), then DAF 64 invokes CAF 54 to outpage the least recently used ("LRU") page (i.e. both the LRU cached file data page and cached filesystem metadata for the LRU page) from shared filesystem cache 51 to storage 59 (step 210). Next, CAF 54 allocates a page in shared filesystem cache 51 for both the new cached file data to be written and the associated filesystem metadata (step 212). After step 212, CAF 54 returns to DAF 64 which updates/writes the new file data and associated metadata of application 34 to the shared filesystem cache 51 (step 214). Referring back to decision 106 yes, branch, for the case where the page of file data to be updated/written and associated filesystem metadata resided in shared filesystem cache 51 when checked in step 204 (decision 206, yes branch), then DAF 64 updates/writes this page of the cached file data as well as the associated metadata in step 214. This completes the write operation requested by application 34. Next, CAF 54 determines if it is time to flush the entire contents of shared filesystem cache 51 to storage 59 (decision 216). There are a variety of well known algorithms and events that can trigger such flushing, for example, timeout of a timer, synchronization of a filesystem or checking the filesystem for inconsistencies. If so, then CAF 54 writes the entire contents of shared filesystem cache 51 to storage (step 220). If not, then CAF 54 invokes LAF 74 to relinquish CAF 54's exclusive/write lock (step 222).

Figure 3:
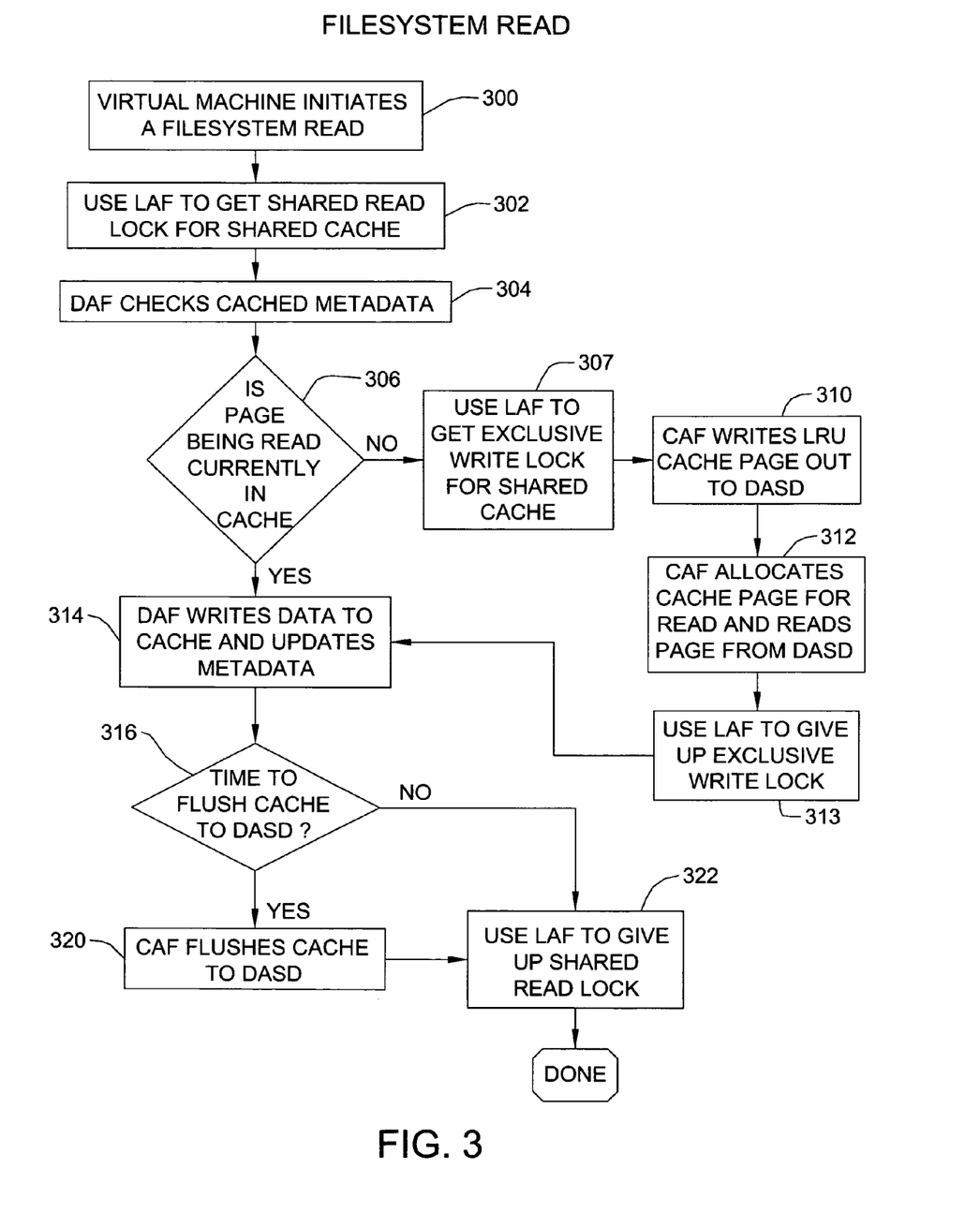
FIG. 3 is a flow chart illustrating a read operation utilizing the shared cache, DAFs, LAFS and CAFs of FIG. 1.
Figure 4:
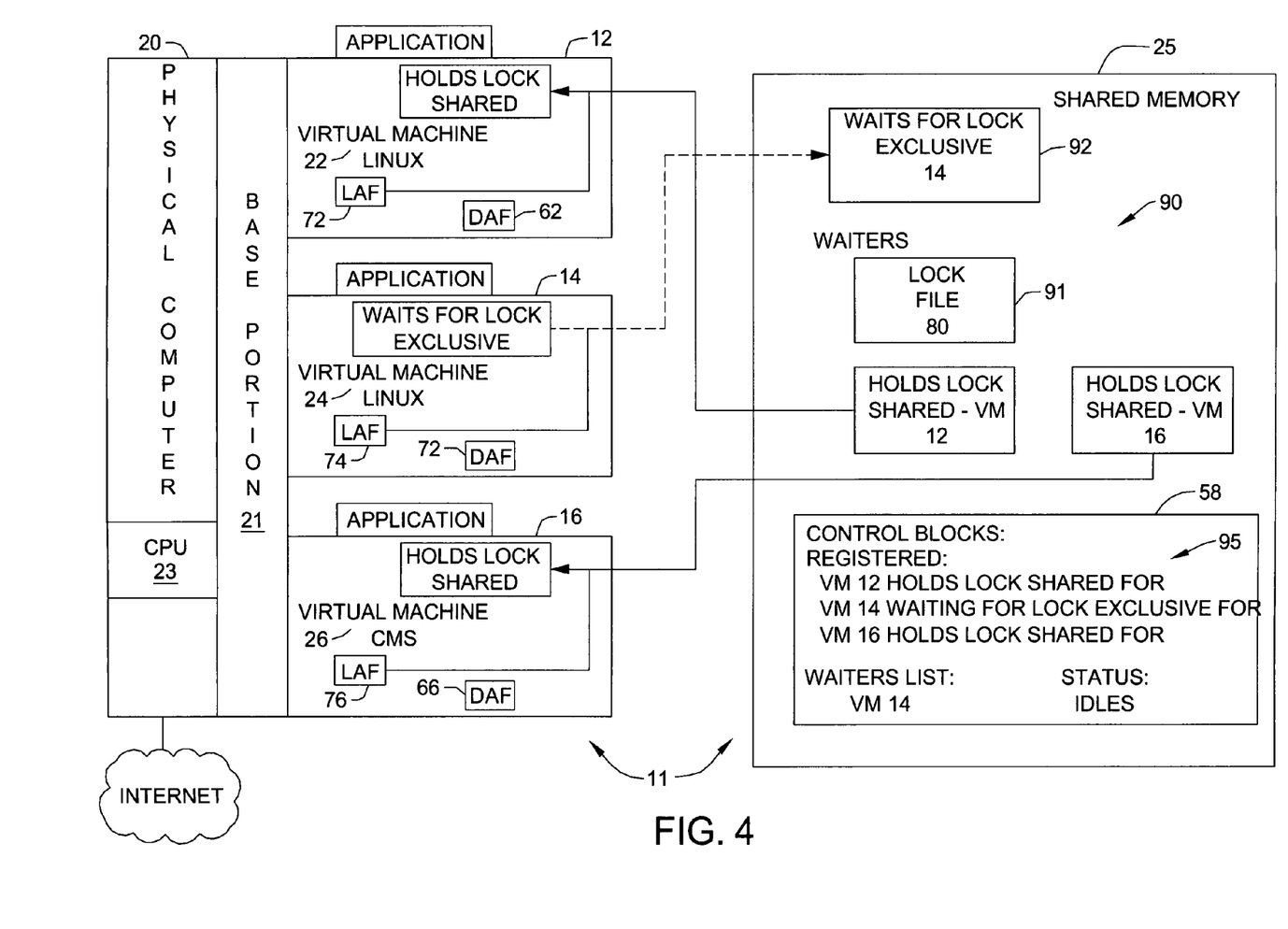
FIG. 4 is a block diagram of the computer system of FIG. 1 illustrating in more detail the LAFs (in one example/scenario) used for the DAFs and CAFs of FIG. 1-3.

FIG. 3 illustrates operation of each LAF, CAF and DAF when the respective virtual machine initiates reading from shared filesystem cache 51. The following iteration of the steps of FIG. 4 is one possible scenario of the LAFs, CAFs and DAFs, for purposes of explanation. In step 300, application 32 within the virtual machine 12 invokes DAF 62 (within operating system 22) to request to read from the shared filesystem cache 51. In response, DAF 62 invokes LAF 72 to obtain a nonexclusive lock for the shared cache 51. In response, LAF 72 checks shared lock structure 58 for the nonexclusive lock for the shared filesystem cache 51 (step 302). The process by which LAF 72 obtains the nonexclusive lock is described in more detail below with reference to FIGS. 4 and 5. The nonexclusive lock will be available immediately if there is no program currently with an exclusive/write lock or waiting in the lock wait queue for an exclusive/write lock. If there is such a program(s), then LAF 72 will obtain the nonexclusive lock after such program(s) relinquish their exclusive/write lock. When LAF 72 obtains the nonexclusive lock for the shared filesystem cache 51, LAF 72 notifies DAF 62. Then, DAF 62 requests to read the cached filesystem metadata 55 to determine if the file portion/page which application 32 wants to read currently resides in cached file data 53 (step 304). If not (decision 306, no branch), then DAF 62 invokes LAF 72 to obtain an exclusive write lock for shared filesystem cache 51 (step 307). The purpose of the exclusive write lock is to allow outpaging from the shared cache. After obtaining the shared write lock, LAF 52 returns to DAF 62 which invokes CAF 52 to outpage the least recently used ("LRU") page (i.e. both the LRU cached file data page and cached filesystem metadata for the LRU page) from shared filesystem cache 51 to storage 59 to make room for the requested page to be read (step 310). Next, CAF 52 allocates a page (location) in shared filesystem cache 51 for both the new cached file data to be read and the associated filesystem metadata, and reads the requested page of file data and associated metadata from storage 59 into shared filesystem cache 51 (step 312). After CAF 52 returns to DAF 62, DAF 62 invokes LAF 72 to relinquish the exclusive write lock on shared filesystem cache 51, and then LAF 72 returns to DAF 62 (step 313). After step 313, DAF 62 reads the requested page of file data and associated metadata from the shared filesystem cache 51 for application 32 (step 314). Referring back to decision 306 yes, branch, for the case where the page of file data to be read and associated filesystem metadata resided in shared filesystem cache 51 when checked in step 304 (decision 306, yes branch), then DAF 62 reads this page of the cached file data as well as the associated metadata in step 314. After step 314, DAF 62 invokes CAF 52 to determine if it is time to flush the entire contents of shared cache 51 to storage 59 (decision 316). There are a variety of well known algorithms and events that can trigger such flushing, for example, time-out of a timer, synchronization of a filesystem or checking the filesystem for inconsistencies. If so (decision 316, yes branch), then CAF 52 writes the entire contents of shared filesystem cache 51 to storage (step 320). After step 320, or if it is not time to flush shared filesystem cache 51, then CAF 52 invokes LAF 72 to relinquish CAF 52's nonexclusive lock (step 322).

FIG. 4 illustrates the lock data structure (or control block) 58 within the shared memory 25 of computer system 10 in more detail. FIG. 4 also illustrates figuratively by lock chain 90 and associated arrows to the virtual machines, the lock wait queue within the lock structure 58. In the illustrated example, both virtual machines 12 and 16 concurrently hold a nonexclusive (read) lock 91 for shared cache 51. Virtual machine 14 has a place holder 92 waiting on virtual machines 12 and 16 for an exclusive (write) lock to shared filesystem cache 51. This is actually recorded in lock structure or control block 58 which indicates that virtual machines 12 and 16 concurrently hold a nonexclusive lock for shared filesystem cache 51 and virtual machine 14 is waiting on virtual machines 12 and 16 for an exclusive lock for shared filesystem cache 51. The "waiter list" 95 of control block 58 indicates the foregoing ownership of the lock, order of the waiter (s), and the nature of each lock, i.e. virtual machines 12 and 16 currently hold lock 91 in a (nonexclusive) shared manner, and virtual machine 14 is currently waiting for the lock in an exclusive manner. Although not shown in FIG. 4, there is a similar lock structure for shared data 78, i.e. other shared files and shared directory, in shared memory 25.

Figure 5:
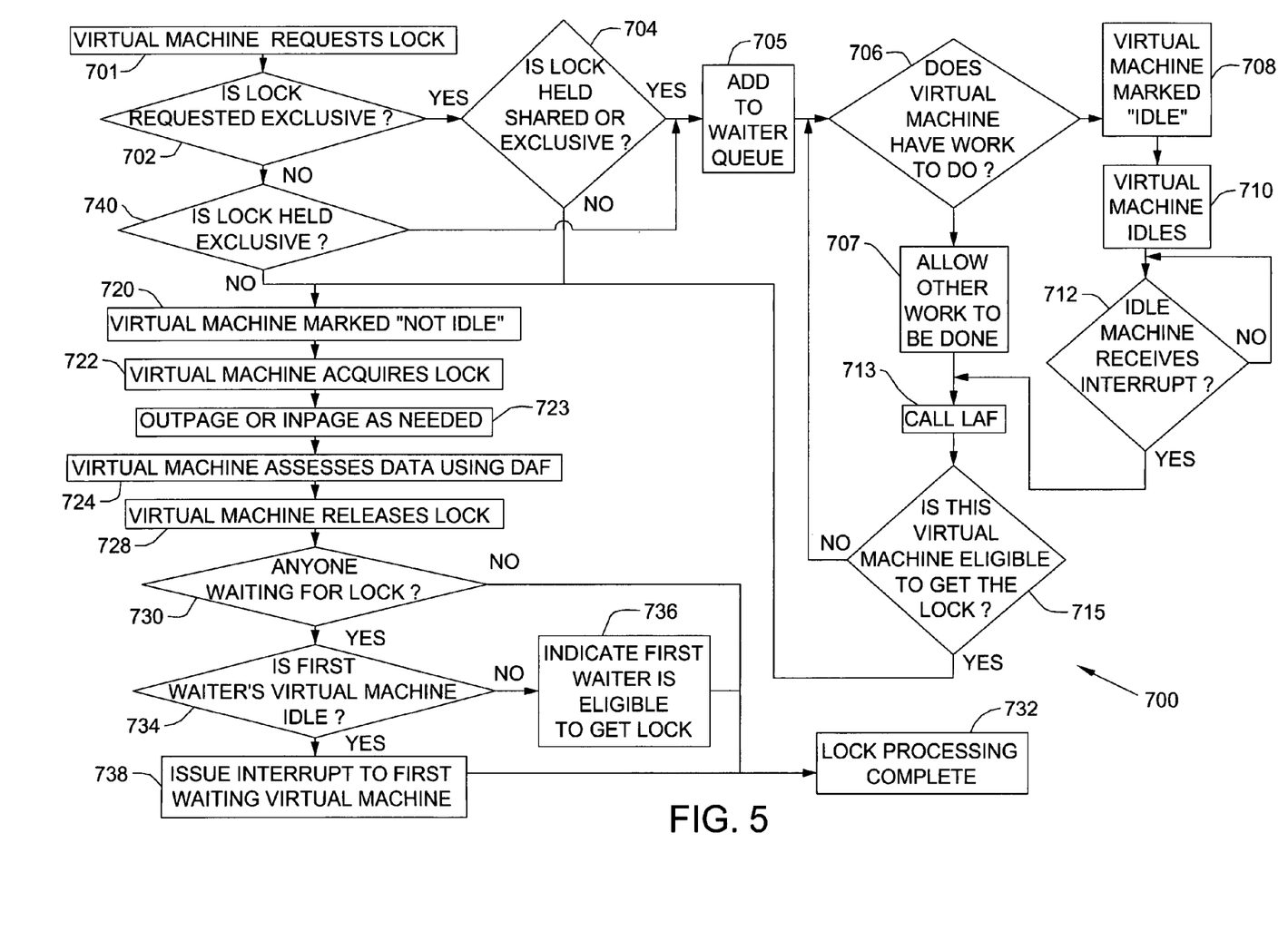
FIG. 5 is a flow chart illustrating the LAFS, DAFs and CAFs of FIG. 4.

FIG. 5 illustrates steps 202 and 202 (and other steps as indicated below) performed by each LAF in response to requests by the respective DAF to obtain the lock for shared filesystem cache 51. (Similar steps occur when each DAF attempts to obtain a lock for other shared data 78 and then access this other shared data 78.) In the following example, a virtual machine 12, 14 or 16 requests a lock for shared cache 51 (step 701). If the virtual machine just wants to read the shared filesystem cache (such as the foregoing example of virtual machines 12 and 16), then the virtual machine need only request a nonexclusive lock. However, if the virtual machine wants to write to the shared filesystem cache (such as the foregoing example of virtual machine 14), then the virtual machine will request an exclusive/write lock. If the request is for an exclusive/write lock, then decision 702 leads to decision 704. In decision 704, the LAF determines if the requested exclusive lock is currently held by another virtual machine (either in a shared or exclusive manner). If so, the exclusive lock is not available to the current requester, and the LAF updates the control block 58 to indicate that the requesting virtual machine is on the "waiter list" and is registered on the wait queue (step 705). Next, the LAF determines if its virtual machine has other work to do (decision 706). If not, then the LAF makes an entry in control block 58 under the category of "status" to indicate that the requesting virtual machine is "idle" (step 708). Then, the LAF causes the requesting virtual machine to enter into the "idle/quiescent" state after making an entry in another control block that this virtual machine is programmed to read when it awakens (step 710). Then, the requesting virtual machine waits for an interrupt (decision 712), at which point it will awaken and read the other control block. This other control block notifies the virtual machine to invoke its LAF (step 713). Referring again to decision 706, if the requesting virtual machine (that cannot get the lock now) has other work to do, the LAF will return control to the guest operating system or application to perform that other work (step 707). Afterwards, the guest operating system will call the LAF (step 713).

When the LAF is called in step 713 via either decision 712 or step 707, the LAF will read control block 58 to determine if its virtual machine is eligible to hold the lock, i.e. if the requested lock is exclusive, that no other virtual machine currently holds the lock, or if the requested lock is shared, that no other virtual machine currently holds the lock in an exclusive manner (decision 715). If the virtual machine is not eligible to hold the lock, then the LAF returns to decision 706 to continue processing as described above. However, if the virtual machine is now eligible to hold the lock, then the LAF acquires the lock (step 722). The acquisition of the lock is accomplished by corresponding update to control block 58, i.e. indication that the requesting virtual machine now holds the lock and is not a waiter. Next, the LAF invokes the DAF of the requesting virtual machine to directly access the shared cache 51 by appropriate address to determine if the shared filesystem cache 51 currently contains the page of interest (step 723/decision 206 or 306). If so, the DAF will read from or write to the cached file data and cached filesystem metadata in shared filesystem cache 51 (step 724/step 214 or 314). If not, the DAF will invoke the CAF to outpage the least recently used page and then inpage the requested page (step 723/steps 210, 212 or 310/312). Afterwards, the CAF notifies the LAF that the virtual machine has completed its access to the shared filesystem cache 51, and in response, the LAF "releases" the lock (step 728/step 222 or 322). In response, the LAF updates the control block 58 to indicate that the requesting virtual machine no longer holds the lock. Also, the LAF determines from the control block 58 if any other virtual machine is currently waiting for the lock (decision 730). If not, the processing of the LAF is complete and control is returned to the guest operating system or application of the LAF's virtual machine (step 732). If so, the LAF determines from the control block 58 if the first virtual machine marked "waiting" is "idle" (decision 734). If not, the LAF makes an entry in another control block that the non idle, waiting virtual machine will check when it completes its current work item (step 736). This entry will notify the waiting virtual machine (step 713) to invoke its LAF to attempt to acquire the lock at step 722. Then, processing is complete for the LAF (step 732) because it would be too disruptive to the non idle, waiting virtual machine to be interrupted at this time. Referring again to decision 734, if the waiting virtual machine is idle, then the LAF makes the entry in the other control block to invoke the LAF of the waiting virtual machine when interrupted, and issues an interrupt to the waiting virtual machine (step 738). This will not be disruptive to the waiting virtual machine because it is idle anyway. Then, the LAF of the requesting virtual machine completes its processing and returns control to the operating system or application of its own virtual machine (step 732). After receiving the interrupt, the idle, waiting virtual machine (step 712) will awaken and can acquire the lock at step 722.

Referring again to decision 704, if the requested lock is not currently held by anyone, then the LAF marks the requesting virtual machine as "not idle" in the "status" category of control block 58 (step 720) and grants the lock to the requesting virtual machine (step 722). The LAF continues processing as described above. Referring again to decision 702, if the lock requested by the virtual machine is shared, such as to read the shared cache 51, then the LAF determines if the lock is currently being held in an exclusive manner (decision 740). If not (i.e. no lock is currently being held or only a nonexclusive lock is currently being held), then the LAF proceeds to step 720 and continues processing as described above. However, if the lock is currently held in an exclusive manner by another virtual machine, then the LAF proceeds to step 705 to add the requesting virtual machine to the waiter list, and then continues as described above.

Each of the operating systems 22, 24, and 26 including their DAFs, LAFs and CAFs can be loaded into computer 20 from a computer storage medium such as magnetic or optic disk, magnetic tape, DVD, etc. or downloaded from network medium such as the Internet via a TCP/IP adapter card. Both the computer storage medium and network medium are collectively called computer readable medium.

Figure 6:
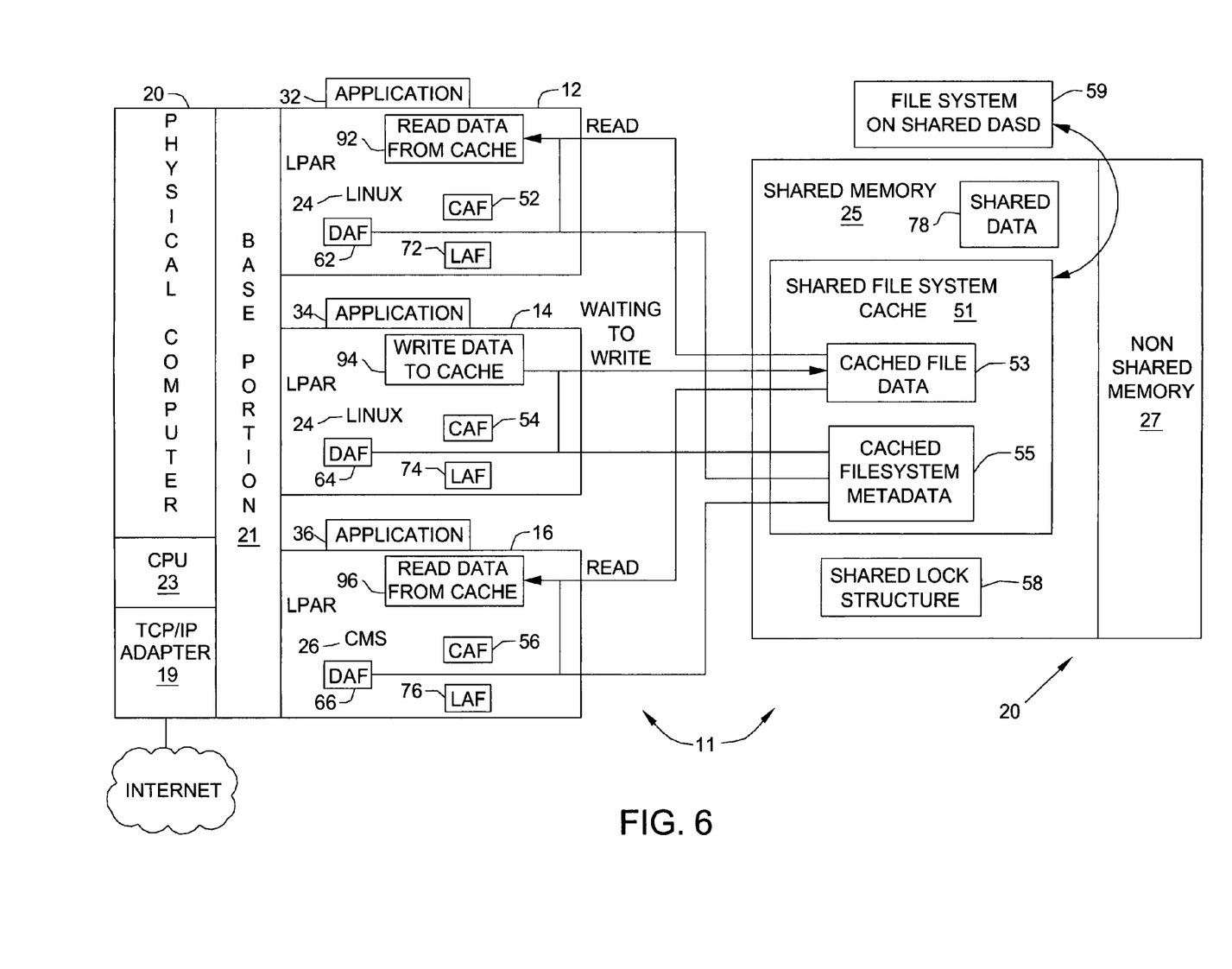
FIG. 6 is a block diagram of another computer system logically divided into LPARs with a shared read/write filesystem cache, data access functions ("DAFs"), lock access functions ("LAFs") and cache access functions ("CAFs") for respective LPARs, according to a second embodiment of the present invention.

FIG. 6 illustrates another embodiment of the present invention generally designated as computer system 111 where operating systems 22,24,26 with their CAFs 52,54,56, DAFs 62,64,66 and LAFs 72,74,76 execute in LPARs 112, 114, 116, respectively, instead of in virtual machines 12,14,16 as in the embodiment of FIG. 1. The LPARs 112,114,116 access the same type of shared memory 25 with the same type of shared filesystem cache 51 in the same manner as do virtual machines 12,14,16 in the embodiment of FIG. 1. The flow charts and flow diagrams of FIG. 2-4 apply to computer system 111 (as well as computer system 11), except the term "LPAR" is substituted for the term "virtual machine" when illustrating operation of CAFs 52,54,56, DAFs 62,64,66 and LAFs 72,74,76 in LPARs 112, 114, 116.

Each of the operating systems 22, 24, and 26 including their DAFs, LAFs and CAFs (in both the virtual machine and LPAR environments) can be loaded into computer 20 from a computer storage medium such as magnetic or optic disk, magnetic tape, DVD, etc. or downloaded from network medium such as the Internet via a TCP/IP adapter card. Both the computer storage medium and network medium are collectively called computer readable medium (which also encompasses the private memory which stores CAFs 52,54, 56, DAFs 62,64,66 and LAFs 72,74,76 after being loaded into the computer systems.)

Based on the foregoing, computer systems, method and program products embodying the present invention has been disclosed. However, numerous modifications and substitutions can be made without deviating from the scope of the present invention. Therefore, the present invention has been disclosed by way of illustration and not limitation, and reference should be made to the following claims to determine the scope of the present invention.

The invention claimed is:

1. A computer system defining first and second virtual machines and a memory shared by said first and second virtual machines, said computer system comprising:

a filesystem cache in said shared memory;

a lock structure in said shared memory to record which virtual machine, if any, currently has an exclusive lock for writing to said filesystem cache;

said first virtual machine includes a first program function to acquire said exclusive lock when available by manipulation of said lock structure, and a second program function active after said first virtual machine acquires said exclusive lock, to write to said filesystem cache, said lock structure being directly accessible by said first program function, said filesystem cache being directly accessible by said second program function; and said second virtual machine includes a third program function to acquire said exclusive lock when available by manipulation of said lock structure, and a fourth program function active after said second virtual machine acquires said exclusive lock, to write to said filesystem cache, said lock structure being directly accessible by said third program function, said filesystem cache being directly accessible by said fourth program function;

wherein said first and second program functions reside in a memory private to said first virtual machine such that said second virtual machine cannot invoke said first or second program functions, and said third and fourth program functions reside in a memory private to said second virtual machine such that said first virtual machine cannot invoke said third or fourth program functions;

a fifth program function, active after said first virtual machine acquires said exclusive lock, to outpage from said filesystem cache to storage when needed to make room for a page requested to be written by said first virtual machine and to inpage said requested page from said storage when not resident in said filesystem cache, said filesystem cache being directly accessible by said fifth program function;

and a sixth program function, active after said second virtual machine acquires said exclusive lock, to outpage from said filesystem cache to storage when needed to make room for a page requested to be written by said second virtual machine and to inpage said requested page from said storage when not resident in said filesystem cache, said filesystem cache being directly accessible by said sixth program function.

2. A system as set forth in claim 1 further comprising storage, wherein said filesystem cache stores a limited number of portions of shared filesystem data and metadata stored in said storage.

3. A system as set forth in claim 1 wherein said filesystem cache stores both file data and associated directory data.

4. A computer system as set forth in claim 1 wherein said first program function is initiated to acquire said lock by a request from a first application within said first virtual machine to write to a file in storage, and said third program function is initiated to acquire said lock by a request from a second application within said second virtual machine to write to said file.

5. A computer system as set forth in claim 1 wherein said lock structure also records which virtual machine, if any, is currently waiting for said exclusive lock for writing to said filesystem cache.

6. A system as set forth in claim 1 wherein: said lock structure also records which virtual machine, if any, currently has a nonexclusive lock for reading from said filesystem cache;

said first program function can acquire said nonexclusive lock when available by manipulation of said lock structure, and said second program function is active after said first virtual machine acquires said nonexclusive lock to read from said filesystem cache; and said third program function can acquire said nonexclusive lock when available by manipulation of said lock structure, and said fourth program function is active after said second virtual machine acquires said nonexclusive lock to read from said filesystem cache.

7. A computer system as set forth in claim 6 wherein both said first and second virtual machines can concurrently hold said nonexclusive lock.

8. A computer system as set forth in claim 6 wherein said lock structure also records which virtual machine, if any, is currently waiting for said nonexclusive lock for reading from said filesystem cache.

9. A computer program product for execution within a computer system defining first and second virtual machines and a memory shared by said first and second virtual machines, said computer program product comprising:

a computer readable storage medium;

first program instructions to define a filesystem cache in said shared memory;

second program instructions to define a lock structure in said shared memory to record which virtual machine, if any, currently has an exclusive lock for writing to said filesystem cache;

third program instructions for execution in said first virtual machine to acquire said exclusive lock when available by manipulation of said lock structure, and fourth program instructions for execution in said first virtual machine active after said first virtual machine acquires said exclusive lock, to write to said filesystem cache, said lock structure being directly accessible by said third program function, said filesystem cache being directly accessible by said fourth program function; and fifth program instructions for execution in said second virtual machine to acquire said exclusive lock when available by manipulation of said lock structure, and sixth program instructions for execution in said second virtual machine active after said second virtual machine acquires said exclusive lock, to write to said filesystem cache, said lock structure being directly accessible by said fifth program instructions, said filesystem cache being directly accessible by said sixth program instructions; and wherein said first, second, third, fourth, fifth and sixth program instructions are stored on said medium;

seventh program instructions for execution in said first virtual machine active after said first virtual machine acquires said exclusive lock, to outpage from said filesystem cache to storage when needed to make room for a page requested to be written by said first virtual machine and to inpage said requested page from said storage when not resident in said filesystem cache, said filesystem cache being directly accessible by said fifth program function; and eighth program instructions for execution in said second virtual machine, active after said second virtual machine acquires said exclusive lock, to outpage from said filesystem cache to storage when needed to make room for a page requested to be written by said second virtual machine and to inpage said requested page from said storage when not resident in said filesystem cache, said filesystem cache being directly accessible by said sixth program function; and wherein said seventh and eighth program instructions are stored on said medium.

10. A computer system defining first and second logical partitions and a memory shared by said first and second logical partitions, said computer system comprising:

a filesystem cache in said shared memory;

a lock structure in said shared memory to record which logical partition, if any, currently has an exclusive lock for writing to said filesystem cache;

said first logical partition includes a first program function to acquire said exclusive lock when available by manipulation of said lock structure, and a second program function active after said first logical partition acquires said exclusive lock, to write to said filesystem cache, said lock structure being directly accessible by said first program function, said filesystem cache being directly accessible by said second program function; and said second logical partition includes a third program function to acquire said exclusive lock when available by manipulation of said lock structure, and a fourth program function active after said second logical partition acquires said exclusive lock, to write to said filesystem cache, said lock structure being directly accessible by said third program function, said filesystem cache being directly accessible by said fourth program function;

wherein said first and second program functions reside in a memory private to said first logical partition such that said second logical partition cannot invoke said first or second program functions, and said third and fourth program functions reside in a memory private to said second logical partition such that said first logical partition cannot invoke said third or fourth program functions;

a fifth program function, active after said first logical partition acquires said exclusive lock, to outpage from said filesystem cache to storage when needed to make room for a page requested to be written by said first logical partition and to inpage said requested page from said storage when not resident in said filesystem cache, filesystem said cache being directly accessible by said fifth program function; and a sixth program function, active after said second logical partition acquires said exclusive lock, to outpage from said filesystem cache to storage when needed to make room for a page requested to be written by said second logical partition and to inpage said requested page from said storage when not resident in said filesystem cache, said filesystem cache being directly accessible by said sixth program function.

11. A system as set forth in claim 10 wherein said filesystem cache stores both file data and associated directory data.

12. A computer system as set forth in claim 10 wherein said first program function is initiated to acquire said lock by a request from a first application within said first logical partition to write to a file in storage, and said third program function is initiated to acquire said lock by a request from a second application within said second logical partition to write to said file.

13. A system as set forth in claim 10 wherein:

said lock structure also records which logical partition, if any, currently has a nonexclusive lock for reading from said filesystem cache;

said first program function can acquire said nonexclusive lock when available by manipulation of said lock structure, and said second program function is active after said first logical partition acquires said nonexclusive lock to read from said filesystem cache; and said third program function can acquire said nonexclusive lock when available by manipulation of said lock structure, and said fourth program function is active after said second logical partition acquires said nonexclusive lock to read from said filesystem cache.

14. A computer program product for execution within a computer system defining first and second logical partitions and a memory shared by said first and second logical partitions, said computer program product comprising:

a computer readable storage medium;

first program instructions to define a filesystem cache in said shared memory;

second program instructions to define a lock structure in said shared memory to record which logical partition, if any, currently has an exclusive lock for writing to said filesystem cache;

third program instructions for execution in said first logical partition to acquire said exclusive lock when available by manipulation of said lock structure, and fourth program instructions for execution in said first logical partition active after said first logical partition acquires said exclusive lock, to write to said filesystem cache, said lock structure being directly accessible by said third program function, said filesystem cache being directly accessible by said fourth program function; and fifth program instructions for execution in said second logical partition to acquire said exclusive lock when available by manipulation of said lock structure, and sixth program instructions for execution in said second logical partition active after said second logical partition acquires said exclusive lock, to write to said filesystem cache, said lock structure being directly accessible by said fifth program instructions, said filesystem cache being directly accessible by said sixth program instructions; and wherein said first, second, third, fourth, fifth and sixth program instructions are stored on said storage medium;

seventh program instructions for execution in said first logical partition active after said first logical partition acquires said exclusive lock, to outpage from said filesystem cache to storage when needed to make room for a page requested to be written by said first logical partition and to inpage said requested page from said storage when not resident in said filesystem cache, said filesystem cache being directly accessible by said fifth program function; and eighth program instructions for execution in said second logical partition, active after said second logical partition acquires said exclusive lock, to outpage from said filesystem cache to storage when needed to make room for a page requested to be written by said second logical partition and to inpage said requested page from said storage when not resident in said filesystem cache, said filesystem cache being directly accessible by said sixth program function; and wherein said seventh and eighth program instructions are stored on said medium.

\* \* \* \* \*